（12） United States Patent
Biegert et al.

(10) Patent No.: US 6,921,599 B2
(45) Date of Patent: Jul. 26, 2005

(54) SEALING ASSEMBLY FOR AN MEA AND METHOD FOR MANUFACTURING THE SEALING ASSEMBLY

(75) Inventors: Hubertus Biegert, Unterkirnach (DE); Gabor Toth, Illertissen-Jedesheim (DE)

(73) Assignee: DaimlerChrysler AG, Stuttgart (DE)

( * ) Notice: Subject to any disclaimer, the term of this patent is extended or adjusted under 35 U.S.C. 154(b) by 398 days.

(21) Appl. No.: 10/223,797

(22) Filed: Aug. 20, 2002

(65) Prior Publication Data

US 2003/0049367 A1 Mar. 13, 2003

(30) Foreign Application Priority Data

Aug. 24, 2001 (DE) ......................................... 101 40 684

(51) Int. Cl.[7] ................................................ H01M 2/06
(52) U.S. Cl. ........................... 429/34; 429/35; 429/36
(58) Field of Search .............................. 429/28, 29, 30, 429/31, 32, 33, 35, 36, 34

(56) References Cited

U.S. PATENT DOCUMENTS

| | | | |
|---|---|---|---|
| 3,522,095 A | 7/1970 | Baker et al. | 136/86 |
| 4,590,134 A | 5/1986 | Warszawski et al. | 429/35 |
| 4,652,502 A | 3/1987 | Breault et al. | 429/13 |
| 5,910,378 A | 6/1999 | Debe et al. | 429/42 |
| 5,945,192 A | 8/1999 | Kato et al. | 428/77 |
| 6,159,628 A | 12/2000 | Grasso et al. | 429/35 |
| 6,165,634 A | 12/2000 | Krasij et al. | 429/35 |
| 6,475,656 B1 | 11/2002 | Koschany et al. | 429/30 |

FOREIGN PATENT DOCUMENTS

| | | | |
|---|---|---|---|
| DE | 1510044 | 5/1969 | |
| DE | 1564441 | 5/1970 | |
| DE | 3516765 | 11/1985 | |
| DE | 36 38 856 | 7/1987 | |
| DE | 19521359 | 12/1996 | |
| DE | 19542475 | 5/1997 | |
| DE | 29811922 | 2/1999 | |
| DE | 10028395 | 12/2000 | |
| DE | 100 52 224 | 7/2002 | |
| DE | 101 24 272 | 11/2002 | |
| DE | 195 48 422 | 3/2003 | |
| EP | 1 246 281 | 10/2002 | |
| GB | 1156038 | 6/1969 | |
| JP | 11045729 | 2/1999 | ............ H01M/8/02 |
| WO | WO 97/23916 | 7/1997 | |
| WO | WO 98/33225 | 7/1998 | |

*Primary Examiner*—Michael Barr
*Assistant Examiner*—Monique Wills
(74) *Attorney, Agent, or Firm*—Davidson, Davidson, Kappel, LLC

(57) ABSTRACT

A method for manufacturing an MEA including a layer system, the layer system together with a plastic film located above and below it being punched out by a heated and shaped punching tool. The film-coated layer system, which is welded together only at the outer edges, is further processed by heating and pressing the marginal zones in a subsequent operation, the plastic film softening or melting in the marginal zone and penetrating the marginal regions. Thus, the marginal region in the periphery of the layer system is sealed in a gas-tight manner within seconds. The film inside the marginal zones which is no longer needed or not heated is removed by suction.

9 Claims, 1 Drawing Sheet

SEALING ASSEMBLY FOR AN MEA AND METHOD FOR MANUFACTURING THE SEALING ASSEMBLY

Priority to German Patent Application No. 101 40 684.3, filed Aug. 24, 2001 and hereby incorporated by reference herein, is claimed.

BACKGROUND INFORMATION

The present invention relates to a method for manufacturing a membrane electrode assembly (MEA) for a fuel cell, the MEA containing a layer system of an anode electrode, a cathode electrode and a membrane arranged therebetween.

German Utility Model Patent DE 298 11 922 U1 describes a fuel cell having two outer plates and an electrode/solid electrolyte system formed by electrodes and at least one solid electrolyte located between the electrodes, the outer plates projecting over the electrode- and solid electrolyte system with their edge, and the space formed between the outer plates and surrounding this system being filled with a seal formed of a curable sealing compound. Upon curing, the plastic material forms a frame between the outer plates which seals the interior space of the fuel cells from the outside in a gas-tight manner and which additionally fixes electrode/solid electrolyte system as well.

Known from German Patent Application DE 195 42 475 A1 is a PEM fuel cell having distribution plates which are made of an elastic, plastically deformable material and feature integrated gas or liquid channels. In order for the individual gas or liquid spaces to be sealed from each other, provision is made for integrated elevations in the distribution plates. These elevations are made by an embossing process, the embossing die used featuring corresponding elevations for forming the gas or liquid channels as well as corresponding depressions for forming the sealing arrangement.

Polymer electrolyte membrane fuel cells are composed of an arrangement of a plurality of membrane electrode assemblies that are separated by bipolar plates, a so-called stack, the membrane electrode assemblies (MEA), in turn, being composed of two catalytically active electrodes for electrochemically converting the chemical substances and of an ion-conducting electrolyte between the electrodes for charge transfer. The bipolar plates are used for separating the gas spaces and for electrically linking the individual cells. The functional requirements of a composite configuration of that kind are a gas- and liquid-tight seal between the fuel cell stacks, preventing, on one hand, loss of working gases and, on the other hand, evaporation of water and the resulting drying out of the polymer electrolyte membrane. The sealing of the gas space between the two bipolar plates and the membrane electrode assemblies is difficult since the upper layers of the MEA have a porous design because of their function.

During the assembly of fuel cells, the polymer electrolyte membranes tend to be contaminated by dust or the like because of the direct handling. Dust but also changing air humidity during storage influence the current-generating capacity of the fuel cell.

SUMMARY OF THE INVENTION

An object of the present invention is to specify a method which allows the edges of an MEA to be sealed from the outside in a particularly simple manner.

To attain this object, the present invention provides a method for manufacturing a membrane electrode assembly for a fuel cell, containing a layer system (1) of an anode electrode, a cathode electrode and a membrane arranged therebetween, comprising the following steps:

a) manufacturing the membrane electrode assembly by joining the polymer electrolyte membrane and the cathode and anode electrodes, it being possible to apply a catalyst layer on the membrane or electrode side, altogether forming the layer system (1), b) applying a polymer material (2) in the form of films to the upper and lower sides of the layer system (1), c) punching and concurrent fastening of the film (2), at least partially, at the outermost edge (3) of the layer system (1), and d) heating and pressing of marginal zones (4) of the film-coated layer system (1), the polymer material softening or melting in the marginal zones and penetrating the marginal zones (4) of the layer system (1).

The part of the film (2) which is not needed or not heated may be removed from the surfaces inside the marginal zones (4) of the layer system (1). The fastening of the film (2) may accomplished by high frequency.

The present invention also provides a method for manufacturing a membrane electrode assembly for a fuel cell, containing a layer system (1) of an anode electrode, a cathode electrode and a membrane arranged therebetween, comprising the following steps a) manufacturing the membrane electrode assembly by joining the polymer electrolyte membrane and the cathode and anode electrodes, it being possible to apply a catalyst layer on the membrane or electrode side, altogether forming the layer system (1), and b) applying and fixing a polymer material (2) in the form of films to the upper and lower sides of the layer system (1), the film projecting on all sides of the MEA, and the polymer material softening or melting in the marginal zones (4) and penetrating the marginal zones (4) of the layer system (1), and the film overhang being interconnected by heating and pressing such that it serves as a seal upon installation between the bipolar plates of a fuel cell.

A polymer material is used that may contains or consists of, as a base material, polyethylene or polyethylene-containing material, polypropylene or polypropylene-containing material, polyester or polyester-containing material, polyamide or polyamide-containing material, ethylene vinyl alcohol or ethylene vinyl alcohol-containing material, polyvinylidene chloride or polyvinylidene chloride-containing material, polyvinyl chloride or polyvinyl chloride-containing material, alone or in combination, and/or graft- and/or co-polymers thereof.

BRIEF DESCRIPTION OF THE DRAWINGS

The present invention will now be further explained with reference to the attached drawings, in which.

DETAILED DESCRIPTION

Figure 1:
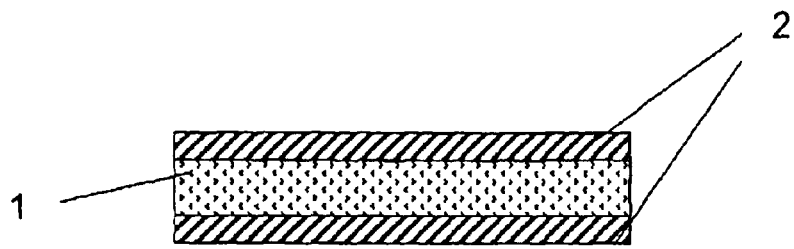
FIG. 1 is a schematic representation of a layer system with films on the upper and lower sides of the system in a sectional view.

FIG. 1 shows a preferred membrane electrode assembly in an intermediate step of the method according to the present invention. A layer system 1 is covered on both sides with a polymer material 2. The method according to the present invention is illustrated in FIGS. 2a, 2b, and FIG. 3.

Figure 2:
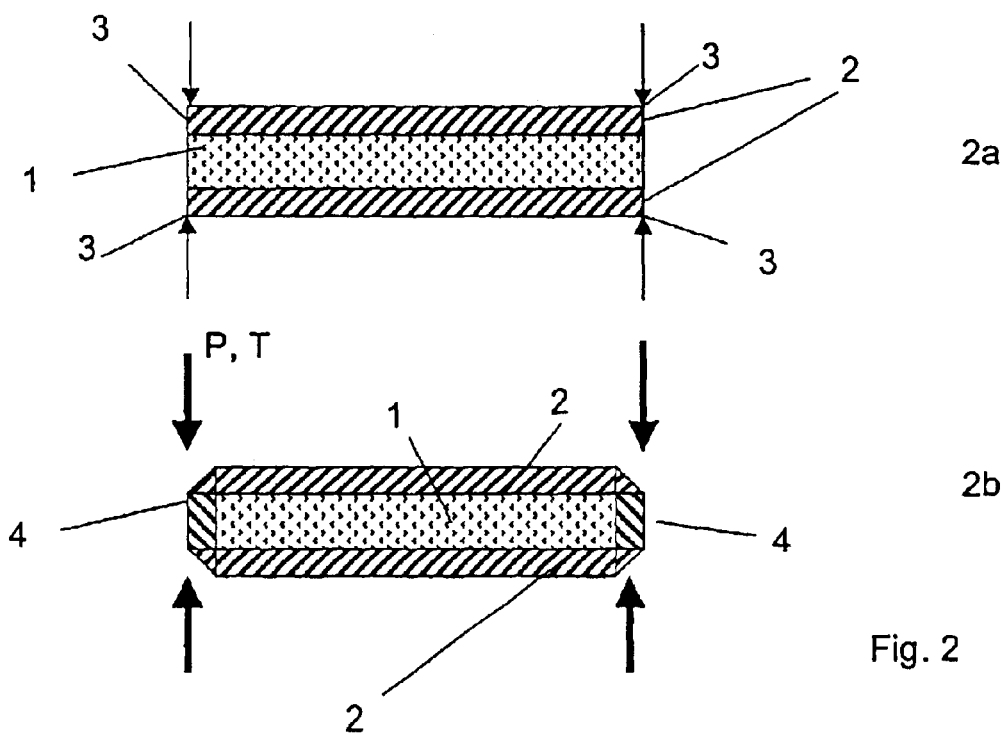
FIG. 2a shows an exemplary schematic representation of the fastening of the film at the outermost edge of the layer system in a sectional view.
FIG. 2b shows an exemplary schematic representation of a pressing and sealing operation in a sectional view.
Figure 3:
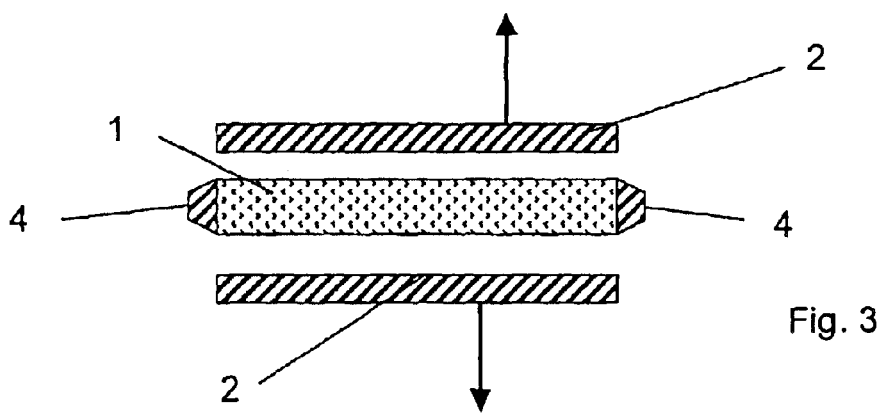
FIG. 3 depicts a preferred embodiment of a removal by suction of the excess film in a sectional view.

In this context, the method for manufacturing a membrane electrode assembly for a fuel cell, containing a layer system 1 of an anode electrode, a cathode electrode and a membrane arranged therebetween, includes the following steps:

a) manufacturing the membrane electrode assembly by joining the polymer electrolyte membrane and the cathode and anode electrodes, it being possible to apply a catalyst layer on the membrane or electrode side, altogether forming layer system 1.

b) applying a polymer material 2 in the form of films to the upper and lower sides of layer system 1, c) punching and concurrent fastening of film 2, at least partially, at outermost edge 3 of layer system 1, as shown by arrows in FIG. 2a, d) heating and pressing of marginal zones 4 of film-coated layer system 1 by the action of pressure p and temperature T, as shown by arrows in FIG. 2b, the polymer material softening or melting in the marginal zones.

In the process, it is also possible for polymer material 2 to penetrate the marginal zones or regions of the layer system.

Subsequently, the not needed or not heated part of film 2 of the surfaces of the layer system that are surrounded by marginal zones 4 is removed, preferably by suction, as shown in FIG. 3. The now exposed surfaces of the layer system form the later active surfaces of the MEA. The surfaces surrounded by marginal zones 4 are constituted by the MEA surfaces covered with polymer material in the form of film that are not sealed with polymer material in a gas-tight manner.

The general manufacturing principles of the layer system 1 can be gathered, for example, from German Patent Application DE 10052224.6, published Jul. 18, 2002, which is hereby incorporated by reference herein, or from German Patent Application DE 10124272.7, which is also hereby incorporated by reference herein. A preferred membrane electrode assembly itself includes at least one gas diffusion layer, at least one carbon base layer, at least one catalyst layer and at least one layer containing a polymer electrolyte membrane. An example of the general structure can be gathered from incorporated-by-reference German Patent Application DE 10052224.6. However, other MEA compositions are also possible.

During the further processing of the layer system produced in this manner, not only layer system 1 but also polymer material 2 are preferably processed in the form of films as rolled goods, it being preferred for the two webs to have the same width. In order to produce a composite of layer system 1 with polymer material 2, corresponding webs of plastic film 2 are continuously fed above and below the still uncut layer system web 1, respectively. In this manner, the polymer material is applied in the form of films to the upper and lower sides of the layer system. This composite is punched out using suitably heated and shaped punching tools. In this context, the punching knives, whose cutting edge corresponds to the particular profile to be punched out, are heated in one embodiment by a heating device, it being convenient for the temperature of the knife to be steplessly controllable using an electrical controller. In the process, the composite of several material layers is peripherally welded along the cutting edge of the punching knife. In addition to the punching knife, the composite of layer system and polymer material to be processed can be heated as well. As an example of a punching tool, reference is made here to Unexamined German Laid-Open Patent Application DE 195 21 359.

In another embodiment, the composite of materials resting against the cutting edge is peripherally welded along the cutting edge of the punching knife by the high frequency field produced at the cutting edges of the punching knife, that is, the individual layers of the composite are connected to each other at their outermost edges. In this method, the knife can additionally be heated. As an example of this embodiment, reference is made to Unexamined German Laid-Open Patent Application DE 1 510 044.

If the MEA and polymer material webs to be processed as rolled goods have the same width and if the MEA and the plastic film end flush with each other at their punched edges, then the mutual fastening of the layers which takes place during the punching is accomplished at their outermost edges, thus interconnecting the MEA layer and the film layers located above and below at their outermost edge.

If the MEA and polymer material webs to be processed as rolled goods have different widths, then only films are punched and interconnected at their outermost edge on two opposite sides of the composite in the direction of motion of the webs during the punching on these sides. The fastening is not accomplished at the MEA. At the two sides of the composite which are transverse to the direction of motion, however, the MEA and the plastic film webs end flush with each other at their punched edges.

Now, a layer system 1 exists which is enveloped by a protective film 2, at least partially fastened at outermost edge 3, and which can easily be further processed. The following operations can be carried out immediately after this process step or after storage, as required.

Due to protective film 2 which surrounds layer structure 1 and acts as a protective covering, layer structure 1 becomes manipulable for mechanical grippers, vibrating screens, or conveyer belts without the possibility of being mechanically damaged by subsequent work process steps. Moreover, the protective covering advantageously prevents sensitive layer system 1 from being contaminated during further processing. Varying air humidity during the storage period or the subsequent processing no longer has any influence on the performance of layer system 1 either. The layer system 1 so protected can be stored for an arbitrary period of time. Moreover, the punching and concurrent fastening of film 2 at least partially at the outermost edge 3 of layer system 1 as described by the methods mentioned above has the advantage that the time required for the punching and welding can be markedly reduced, thus allowing high numbers of pieces and small cycle times; on the other hand, this procedure results in a product having a more uniform quality.

Since polymer material 2 used for the seal is cheaper compared to the usually used silicone material, the arising sealing material costs are lower and the waste is 100% recyclable. In comparison with other materials which, in addition, have to be cured or crosslinked, the preferably thermoplastic film material 2 has the advantage of easy handling combined with a protective action against dust and/or mechanical damage during storage or prior to further processing with respect to layer system 1 due to the still unremoved protective film 2.

The next operation includes a membrane electrode assembly which contains a layer system 1 of an anode electrode, a cathode electrode and a membrane arranged therebetween and in which marginal zones 4 or marginal regions of layer system 1 are sealed from the surroundings and from the working gases by a polymer material 2 which has been applied there and penetrated into marginal zones 4. As indicated in FIG. 2b as a possible embodiment, layer system 1, which is provided with the protective covering, is inserted into a press. By heating and pressing marginal zones 4 of film-coated layer system 1, polymer material 2 located in marginal zone 4 softens or melts and penetrates marginal zones 4 of layer system 1. The material melted or softened in this manner penetrates through the porous layer up to the polymer electrolyte membrane on both sides. This process is also referred to as saturation. Thus, the marginal region in the periphery of the layer system is sealed in a gas-tight manner within seconds. The film 2 which is located inside sealed marginal zones 4 and is no longer needed or not heated is removed, for example, by suction, as exemplarily shown in FIG. 3.

The now existing membrane electrode assembly which is peripherally sealed and gas-tight in the edges can then be installed between two bipolar plates in a simple manner, it being possible to provide additional sealing material as well. However, the additional sealing material used in the interconnection of the individual components can advantageously be minimized.

Depending on the width and also on the thickness of the gas-tight edges which are sealed or saturated with polymer material, it is also possible to punch holes in the corners for the passage ports of the working gases. This has the advantage that no additional surfaces or other reinforcements have to be bonded to the MEA. Moreover, by hot-pressing or heat-sealing during process step d, preferably using a die, it is possible to achieve a pointwise reinforcement on the MEA in certain areas of limited size on the non-sealed film-coated MEA surface in order to introduce gases at this location in addition to the existing passage ports located in the corners. If the working gases impinge on the MEA from behind at high partial pressure, hot spots occur on the membrane which can cause a burnthrough at this location. The working gases coming from the bipolar plate and impinging on the MEA at this location, now flow around this reinforcement in an advantageous manner and therefore impinge on the non-sealed reactive surfaces of the MEA, which are no longer coated with film, at reduced partial pressure.

As a further variant of the first method of the present invention described above, the MEA and polymer material webs to be processed as rolled goods can also have different widths relative to each other during the further processing of the MEA according to process step b. The polymer material hangs over the edges along the direction of motion. This difference in width of the plastic film web can be several mm to several cm. The film web can have a punch profile at its edges along the direction of motion. The punching and concurrent fastening of the layer system with the polymer material takes place along the cutting edge of the punch die, the two opposite edges of the film-coated MEA which do not hang over but end flush with each other and which are transverse to the direction of motion being fastened or connected to each other, preferably welded to each other, at the outermost edge of the layer system. At the same time, the projecting edges of the plastic film web which were located along the direction of motion of the webs are fastened or connected to each other, preferably welded together, at the outermost end of their cut edge. By the subsequent heating and pressing of the marginal zones of the film-coated layer system, during which the polymer material softens or melts in the marginal zones, the marginal zones of the layer system that end flush with the MEA are penetrated by the polymer material, the marginal zones of the layer system with the projecting film edges being welded together in the periphery of their projecting film edges, the edges of the layer system that do not end flush with the film web also being penetrated by the polymer material at their outermost edge.

In the process, it is also possible to apply pointwise reinforcements within the MEA concurrently or subsequently to process step d, as already described.

A second method according to the present invention for manufacturing a membrane electrode assembly for a fuel cell according, containing a layer system (1) of an anode electrode, a cathode electrode and a membrane arranged therebetween, includes the following steps a) manufacturing the membrane electrode assembly by joining the polymer electrolyte membrane and the cathode and anode electrodes, it being possible to apply a catalyst layer on the membrane or electrode side, altogether forming layer system (1), b) applying and fixing a polymer material (2) in the form of films to the upper and lower sides of layer system (1), the film projecting on all sides of the MEA, and the polymer material softening or melting in marginal zones (4) and penetrating marginal zones (4) of layer system (1), and the film overhang being interconnected by heating and pressing such that it serves as a seal upon installation between the bipolar plates of a fuel cell. The part of film (2) which is not needed or not heated is removed, preferably by suction, from the surfaces of layer system (1).

The membrane electrode assembly, which has previously been manufactured according to process step a, is cut or punched to the required size. Subsequently, this layer system is overlaid and underlaid with polymer material in the form of a film, the film projecting on all sides of the MEA. This film overhang can be several mm to several cm. Subsequently, the film overhang is interconnected by heating and pressing, the outermost edges of the layer system also being penetrated by the softened or molten polymer material. In the process, it is also possible to apply pointwise reinforcements within the MEA concurrently or subsequently to process step b, as already described.

The projecting film edge serves as a seal upon installation between the bipolar plates of a fuel cell. Depending on the required film thickness, this overhang can be used as a seal alone or in conjunction with conventional sealing techniques. Here too, the part of the film which is not needed or not heated is removed from the surfaces of layer system before the MEA produced in this manner is fitted into a fuel cell.

However, the selection of suitable sealing materials is not unproblematic. Apart from the required sealing properties, such as gas and water vapor barrier properties, the material has to resist dry or moist working gases such as oxygen, hydrogen, at elevated temperature (approx. 120° C.) under permanent load without the sealing material aging due to embrittlement or degradation or even swelling, that is, the material must, in addition, be stable to hydrolysis. The use of material including additives such as plasticizers results in that the additives diffuse out of the material and deposit elsewhere or poison the catalyst in the course of time, which can cause a premature failure of the system.

It is preferred for the sealing material to be thermoplastic. Suitable thermoplastic polymers include only those that meet the specific requirements in a hydrogen-oxygen fuel cell with regard to the mechanical and chemical requirements. Moreover, the thermoplastic material is required to remain stable up to at least 120° C., maintaining all the properties mentioned above. The polymer material contains or consists of, as a base material, polyethylene or polyethylene-containing material, polypropylene or polypropylene-containing material, polyester or polyester-containing material, polyamide or polyamide-containing material, ethylene vinyl alcohol or ethylene vinyl alcohol-containing material, polyvinylidene chloride (PVDC) or polyvinylidene chloride-containing material, polyvinyl chloride (PVC) or polyvinyl chloride-containing material, alone or in combination, and/or graft- and/or co-polymers thereof. However, it is also possible to modify the polymer material in a manner which makes it possible to achieve certain physical and/or chemical properties which are required for the processing (for example, sealing ability) or for service in a fuel cell. This can be accomplished by the chemical modification of the base material per se and/or by adding property-controlling additives or admixtures. The requirements placed on the barrier materials can be very diverse. The requirements can be to the effect that barriers have to be created against substances which have completely different properties. The required catalog of properties can frequently not be met by one material alone so that different materials have to be combined in form of composites. Film composites for fuel cells have to be composed of a combination of a moisture barrier with a gas barrier. In this context, for example, polyolefins such as polypropylene or polyethylene form the moisture barrier layer and polar materials such as polyamide, ethylene vinyl alcohol or polyester form the gas barrier. Between the mostly incompatible individual layers, coupling agents are used which are familiar to one skilled in the art and which have sufficient affinity for both partners due to their chemical structure.

What is claimed is:

1. A method for manufacturing a membrane electrode assembly for a fuel cell, the membrane electrode assembly including a layer system having an anode electrode, a cathode electrode and a polymer membrane arranged between the anode electrode and the cathode electrode, the method comprising the steps of:

manufacturing the fuel cell membrane electrode assembly by joining the polymer membrane, the cathode electrode and the anode electrode, so as to define the layer system, the layer system having a first side, a second side and an outermost edge, a catalyst layer capable of being applied on a side of the membrane or one of the electrodes;

applying a polymer material in the form of films to the first and second sides of the layer system;

punching and concurrently fastening the film, at least partially, at the outermost edge of the layer system;

heating and pressing marginal zones of the film-coated layer system, the polymer material softening or melting in the marginal zones and penetrating the marginal zones of the layer system.

2. The method as recited in claim 1, wherein a part of the film not needed or not heated is removed from surfaces inside the marginal zones of the layer system.

3. The method as recited in claim 1 wherein the fastening of the film is accomplished using a high frequency.

4. The method as recited in claim 1 wherein the first side is an upper side and the second side a lower side.

5. The method as recited in claim 1 wherein the polymer material includes polyethylene or polyethylene-containing material, polypropylene or polypropylene-containing material, polyester or polyester-containing material, polyamide or polyamide-containing material, ethylene vinyl alcohol or ethylene vinyl alcohol-containing material, polyvinylidene chloride or polyvinylidene chloride-containing material, polyvinyl chloride or polyvinyl chloride-containing material, alone or in combination, and/or graft- and/or co-polymers thereof.

6. A method for manufacturing a membrane electrode assembly for a fuel cell, the membrane electrode assembly including a layer system having an anode electrode, a cathode electrode and a membrane arranged between the anode electrode and the cathode electrode, the method comprising the steps of:

manufacturing the membrane electrode assembly by joining the polymer membrane, the cathode electrode and the anode electrode, so as to define the layer system, the layer system having a first side, a second side and an outermost edge, a catalyst layer capable of being applied on a side of the membrane or one of the electrodes;

applying and fixing a polymer material in the form of films to the first and second sides of the layer system, the film projecting on all sides of the membrane electrode assembly, and the polymer material softening or melting in marginal zones of the layer system and penetrating the marginal zones of the layer system, a film overhang being interconnected by heating and pressing such that the overhang serves as a seal upon installation of the membrane electrode assembly between bipolar plates of a fuel cell.

7. The method as recited in claim 6 wherein a part of the film not needed or not heated is removed from surfaces inside the marginal zones of the layer system.

8. The method as recited in claim 6 wherein the polymer material includes polyethylene or polyethylene-containing material, polypropylene or polypropylene-containing material, polyester or polyester-containing material, polyamide or polyamide-containing material, ethylene vinyl alcohol or ethylene vinyl alcohol-containing material, polyvinylidene chloride or polyvinylidene chloride-containing material, polyvinyl chloride or polyvinyl chloride-containing material, alone or in combination, and/or graft- and/or co-polymers thereof.

9. The method as recited in claim 6 wherein the first side is an upper side and the second side a lower side.

* * * * *